(12) United States Patent
Park (10) Patent No.: US 8,833,749 B2
(45) Date of Patent: Sep. 16, 2014

(54) HOLDER FOR SPOT WELDER TIP DRESSER WITH ADJUSTABLE CUTTING RATE

(76) Inventor: Hea-Man Park, Seoul (KR)

( * ) Notice: Subject to any disclaimer, the term of this patent is extended or adjusted under 35 U.S.C. 154(b) by 408 days.

(21) Appl. No.: 13/144,769

(22) PCT Filed: May 19, 2010

(86) PCT No.: PCT/KR2010/003157
§ 371 (c)(1),
(2), (4) Date: Jul. 15, 2011

(87) PCT Pub. No.: WO2011/002158
PCT Pub. Date: Jan. 6, 2011

(65) Prior Publication Data
US 2012/0126471 A1 May 24, 2012

(30) Foreign Application Priority Data

Jun. 30, 2009 (KR) ........................ 10-2009-0058873

(51) Int. Cl.
| | |
|---|---|
| *B25B 1/22* | (2006.01) |
| *B23Q 3/02* | (2006.01) |
| *B25B 1/02* | (2006.01) |
| *B25B 1/10* | (2006.01) |
| *B23B 5/16* | (2006.01) |
| *B23K 11/30* | (2006.01) |
| *B24B 53/12* | (2006.01) |

(52) U.S. Cl.
CPC ............. *B23K 11/3063* (2013.01); *B23B 5/166* (2013.01); *B24B 53/12* (2013.01)
USPC ............... 269/285; 269/71; 269/95; 269/143; 269/249

(58) Field of Classification Search
CPC ....................................... B23B 5/00
USPC .......... 269/285, 71, 95, 143, 249; 407/2, 3, 4, 407/5; 409/137
See application file for complete search history.

(56) References Cited

U.S. PATENT DOCUMENTS 5,332,342 A * 7/1994 Kizaki et al. .................. 409/139

FOREIGN PATENT DOCUMENTS

| JP | 07-256467 A | 10/1995 |
| JP | 2001-287046 A | 10/2001 |

(Continued)

OTHER PUBLICATIONS

International Search Report, Application No. PCT/KR2010/003157, dated Dec. 16, 2010.

*Primary Examiner* — Lee D Wilson
*Assistant Examiner* — Seahee Yoon
(74) *Attorney, Agent, or Firm* — Novick, Kim & Lee, PLLC; Jae Youn Kim; Sang Ho Lee (57) ABSTRACT

A holder for a spot welder tip dresser with an adjustable cutting rate is disclosed. The holder includes a cutter to cut a spot welder tip, a holder body provided at both ends thereof with a pair of guide surfaces to guide the spot welder tip, an adjusting liner configured to come into close contact with the cutter and which adjusts a protruding length of the cutter, and a clamp to fix the adjusting liner and the cutter to the holder body. A cutting rate of the spot welder tip is adjusted according to a thickness of the adjusting liner. Accordingly, reduced maintenance costs are accomplished by maintaining a constant cutting rate of a tip and forming an even welding spot at the tip, and reduced overall welding time and improved welding quality are accomplished owing to rapid tip cutting and formation of an even nugget at the tip.

8 Claims, 7 Drawing Sheets

(56) References Cited

FOREIGN PATENT DOCUMENTS

| | | |
|---|---|---|
| JP | 2005-0125395 A | 5/2005 |
| JP | 2008-023589 A | 2/2008 |
| KR | 20-0277041 Y1 | 5/2002 |
| KR | 20-0439234 Y1 | 3/2008 |

* cited by examiner

HOLDER FOR SPOT WELDER TIP DRESSER WITH ADJUSTABLE CUTTING RATE

BACKGROUND OF THE INVENTION

1. Field of the Invention

The present invention relates to a holder for a spot welder tip dresser, and more particularly, to a holder for a spot welder tip dresser with an adjustable cutting rate, which functions to center a spot welder tip of a spot welding robot and adjust the protruding length of a cutter so as to enable adjustment of a cutting rate of the tip.

2. Description of the Related Art

A spot welder, which is generally used to weld vehicle panels, etc., is a resistance welder in which upper and lower electrode tips are positioned to press both surfaces of metal panels and apply electric current thereto so as to weld them. There broadly exist two kinds of spot welders depending on pressure mechanisms.

The two kinds of spot welders include an air gun which employs a pneumatic cylinder as a pressure drive source, and a servo gun which employs a servo motor as a pressure drive source.

Although the air gun has mainly been used, the air gun is currently being replaced by the servo gun for the purpose of improving welding quality because the servo gun is capable of more precisely adjusting pressure. To improve welding quality, moreover, it is important to periodically cut an electrode tip of a welder by an appropriate degree so as to form and maintain even nuggets (welding spots) of the electrode tip.

Here, factors determining cutting rate per revolution of a tip dresser include the protruding length of a cutter from a guide surface of a holder and pressure of a welding gun during dressing of the tip.

Korean Registered Utility Model No. 0439234 discloses a conventional holder for a tip dresser in which a cutter 120 is closely secured to a partition 113 so as to protrude by a predetermined height. More particularly, if dressing pressure of a welding gun exceeds a preset pressure, the welding gun may push a tip beyond the preset pressure, causing excessive cutting of the tip. This disadvantageously causes frequent replacement of the tip due to an excessive cutting rate of the tip. On the other hand, if the dressing pressure of the welding gun is lower than the preset pressure, the welding gun may exert a force insufficient to correctly cut the tip and consequently, cause formation of uneven nuggets at the tip.

This may disadvantageously deteriorate welding quality or consume excessively long time for cutting the tip. As a result, time delay due to frequent replacement of tips or relatively long cutting time results in increased overall welding time and maintenance costs.

SUMMARY OF THE INVENTION

Therefore, the present invention has been made in view of the above problems, and it is an object of the present invention to provide a holder for a spot welder tip dresser with an adjustable cutting rate, wherein an adjusting liner, which is capable of adjusting the protruding length of a cutter to allow the holder to be applied to both an air gun and a servo gun, is installed to set a constant cutting rate of a tip, and wherein the circumference of a guide surface is in an angular range between 185 degrees and 200 degrees to prevent the tip from deviating from the guide surface, which enables formation of even nuggets at the tip.

In accordance with the present invention, the above and other objects can be accomplished by the provision of a holder for a spot welder tip dresser with an adjustable cutting rate, which includes a cutter to cut a spot welder tip, the holder further including a holder body provided at both ends thereof with a pair of guide surfaces to guide the spot welder tip, an adjusting liner configured to come into close contact with the cutter and which adjusts a protruding length of the cutter, and a clamp to fix the adjusting liner and the cutter to the holder body, wherein a cutting rate of the spot welder tip is adjusted according to a thickness of the adjusting liner.

The holder body may include an insertion groove formed between the pair of guide surfaces, into which the adjusting liner is inserted, which allows the adjusting liner to be firmly secured to the holder body.

The adjusting liner may have a constant thickness over the entire length thereof, or may be provided with a replaceable convex or concave piece at a surface thereof in close contact with the cutter, to enable adjustment of the protruding length of the cutter.

The clamp may be provided at a surface thereof with a guide groove to assist the adjusting liner in being more firmly secured to the holder body.

The circumference of the guide surface may be in an angular range between 185 degrees and 200 degrees on the basis of the center of the guide surface, to assure easy discharge of chips cut from the spot welder tip and prevent the spot welder tip from deviating from the center of the guide surface.

The clamp may be provided at one end thereof with a raised anti-separation portion, to prevent the adjusting liner and the cutter from moving from the holder body.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

The present invention aims at a holder 1 for a spot welder tip dresser with an adjustable cutting rate using a cutter 30 to cut a spot welder tip, with characteristics in that the holder 1 includes a holder body 10 provided at both ends thereof with a pair of guide surfaces 11 to guide the spot welder tip, an adjusting liner 20 configured to come into close contact with the cutter 30 and which adjusts a protruding length of the cutter 30, and a clamp 40 to fix the adjusting liner 20 and the cutter 30 to the holder body 10, wherein the cutting rate of the spot welder tip is adjusted according to a thickness of the adjusting liner 20.

The holder body 10 may be provided with an insertion groove 12 between the pair of guide surfaces 11, into which the adjusting liner 20 is inserted, which allows the adjusting liner 20 to be firmly secured to the holder body 10.

To enable adjustment of the protruding length of the cutter 30, the adjusting liner 20 may have a constant thickness over the entire length thereof, or may be provided with a replaceable convex or concave piece at a surface thereof in close contact with the cutter 30.

The clamp 40 may be provided at a surface thereof with a guide groove 42 to assist the adjusting liner 20 in being more firmly secured to the holder body 10.

The holder body 10 may be configured in such a manner that the circumference of the guide surface 11 is in an angular range between 185 degrees and 200 degrees on the basis of the center of the guide surface 11, in order to assure easy discharge of chips cut from the spot welder tip and prevent the spot welder tip from deviating from the center of the guide surface 11.

The clamp 40 may be provided at one end thereof with a raised anti-separation portion 44, in order to prevent the adjusting liner 20 and the cutter 30 from moving from the holder body 10.

Hereinafter, an exemplary embodiment of the present invention will be described in detail with reference to the accompanying drawings.

Prior to describing the exemplary embodiment, it is noted that although the holder 1 for a spot welder tip dresser with an adjustable cutting rate in accordance with the exemplary embodiment of the present invention may be installed at various angles, the following description is given with relation to an example in which the holder 1 is horizontally installed for better understanding and a welding gun and a welding tip are well known in the art and thus, illustration and detailed description thereof will be omitted herein.

As illustrated in FIGS. 1 to 5, the holder 1 for a spot welder tip dresser with an adjustable cutting rate in accordance with the exemplary embodiment of the present invention includes the holder body 10, the adjusting liner 20, the cutter 30, the clamp 40 and fastening screws 50.

Figure 1:
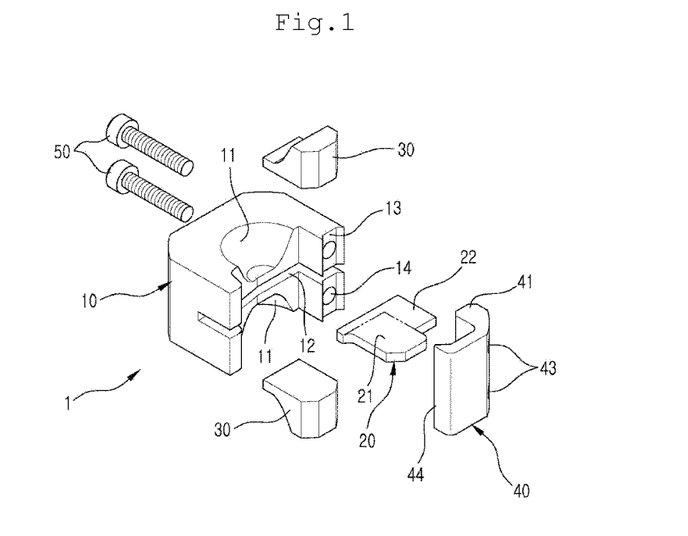
FIG. 1 is an exploded perspective view of a holder for a spot welder tip dresser with an adjustable cutting rate in accordance with an exemplary embodiment of the present invention.
Figure 2:
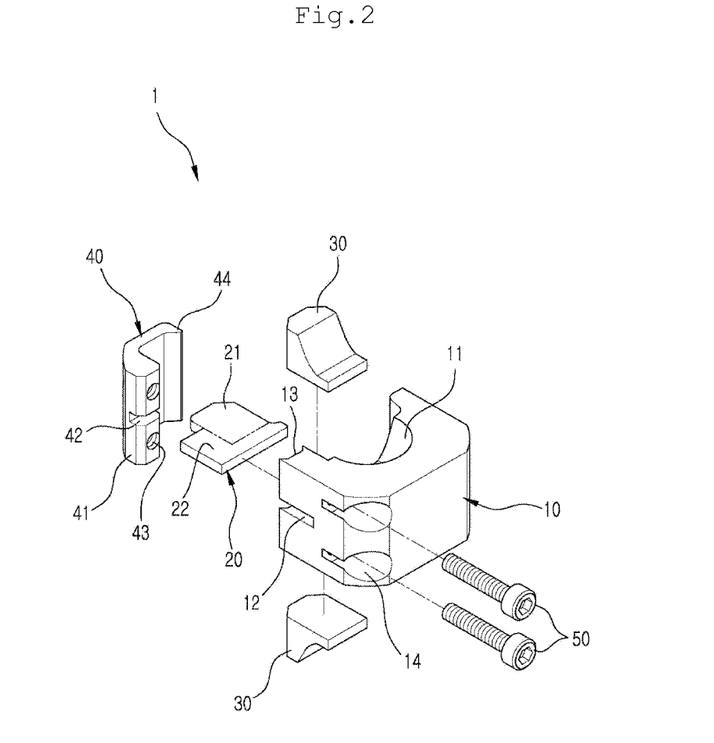
FIG. 2 is an exploded perspective view of the holder for a spot welder tip dresser with an adjustable cutting rate in accordance with the exemplary embodiment of the present invention, as viewed from the rear side.
Figure 3:
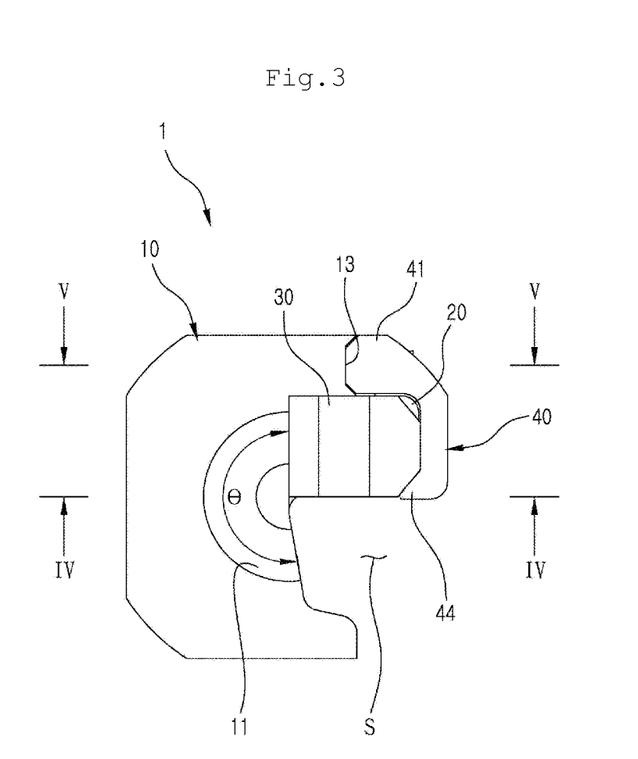
FIG. 3 is a plan view of the holder for a spot welder tip dresser with an adjustable cutting rate in accordance with the exemplary embodiment of the present invention.

The holder body 10 is provided respectively at upper and lower ends thereof with the guide surfaces 11, which are recessed to have an approximately semicircular shape, and a raised coupling surface 13 to which the clamp 40 is coupled so as to enable firm seating of the cutter 30. The insertion groove 12 is horizontally formed in one surface of the holder body 10 between the guide surfaces 11 such that the adjusting liner 20 is inserted into the insertion groove 12. The coupling surface 13 of the holder body 10 takes the form of a concave surface having an approximately trapezoidal shape in order to prevent left-and-right movement of the clamp 40. The coupling surface 13 is perforated with screw holes 14 through which the fastening screws 50 respectively penetrate. Each guide surface 11 of the holder body 10 has a predetermined angle θ of circumference on the basis of the center thereof, in order to prevent the tip from deviating from the center of the guide surface 11. The predetermined angle θ is preferably between 185 degrees and 200 degrees and more preferably, is 190 degrees, to assure easy discharge of chips cut from the tip. This will be described later in more detail.

The adjusting liner 20 has a constant thickness t suitable to be inserted into the insertion recess 12 of the holder body 10 and is divided into a seat part 21 and an insert part 22. The seat part 21 serves to support the cutter 30 seated thereon. The insert part 22 is located around right and rear edges of the seat part 21 and is partially stepped with respect to the seat part 21. With this configuration, the adjusting liner 20 is inserted into the insertion groove 12 so as to set the protruding length of the cutter 30. This will be described later in more detail.

The cutter 30 is well known and conventional examples thereof are disclosed in Korean Registered Utility Model Nos. 0277041 and 0439234. Thus, a detailed description thereof will be omitted herein.

The clamp 40 includes a coupling portion 41 to be attached to the coupling surface 13 of the holder body 10. The coupling portion 41 is formed by bending one end of the clamp 40 and allows the cutter 30 to be inserted between the holder body 10 and the clamp 40. The coupling portion 41 is provided with female screws 43, through which the fastening screws 50 penetrate respectively. Also, the coupling portion 41 is centrally provided with the guide groove 42 to assist the adjusting liner 20 in being more firmly secured to the holder body 10. The guide groove 42 of the clamp 40 has a depth corresponding to the stepped portion of the adjusting liner 20 such that the stepped portion of the adjusting liner 20 is caught by the guide groove 42 so as not to be separated from between the holder body 10 and the clamp 40. The clamp 40 may be further provided at the other end thereof with the raised anti-separation portion 44, which serves to prevent the cutter 30 and the adjusting liner 20 from moving inward of the holder body 10. With this configuration, the clamp 40 prevents left-and-right movement of the cutter 30 and the adjusting liner 20 and allows the cutter 30 and the adjusting liner 20 to be more firmly secured to the holder body 10, which enables acquisition of a smoother and higher quality tip welding spot during tip cutting. Here, the coupling portion 41 has a shape corresponding to that of the coupling surface 13 and serves to prevent left-and-right movement of the clamp 40. Of course, although the clamp 40 is secured to the holder body 10 by means of the fastening screws 50, in order to allow the fastening screws 50 to be more easily fastened through the female screws 43 of the clamp 40 when the clamp 40 is brought into close contact with the coupling surface 13 of the holder body 10, it is desirable that the coupling surface 13 of the holder body 10 be concave and the coupling portion 41 of the clamp 40 be convex to mate with the coupling surface 13 of the holder body 10.

Referring to FIG. 3 illustrating an assembled configuration of the holder 1 for a spot welder tip dresser with an adjustable cutting rate in accordance with the exemplary embodiment of the present invention, a chip discharge space S is defined between the holder body 10 and the cutter 30. The guide surface 11 of the holder body 10 is configured in such a manner that the angle of circumference thereof is determined in consideration of two functions of preventing the tip from deviating from the center of the guide surface 11 and of assuring easy discharge of chips cut from the tip out of the holder body 10. For example, if the angle of circumference of the guide surface 11 is greater than 200 degrees, this may further prevent the tip from deviating from the guide surface 11, more particularly, from the center of the guide surface 11, but may reduce the chip discharge space S, thus causing deterioration in chip discharge efficiency. On the other hand, if the angle of circumference of the guide surface 11 is less than 185 degrees, this may increase the chip discharge space S to assure easy discharge of chips, but may have a risk of the tip from deviating from the guide surface 11 to the cutter 30 and consequently, causing excessive cutting of the tip. For this reason, to optimize the above described functions, the angle of circumference of the guide surface 11 is preferably in a range between 185 degrees and 200 degrees and more preferably, 190 degrees.

Operations of the holder 1 for a spot welder tip dresser with an adjustable cutting rate in accordance with the exemplary embodiment of the present invention will now be described in detail with reference to FIGS. 4, 6 and 7.

Figure 6:
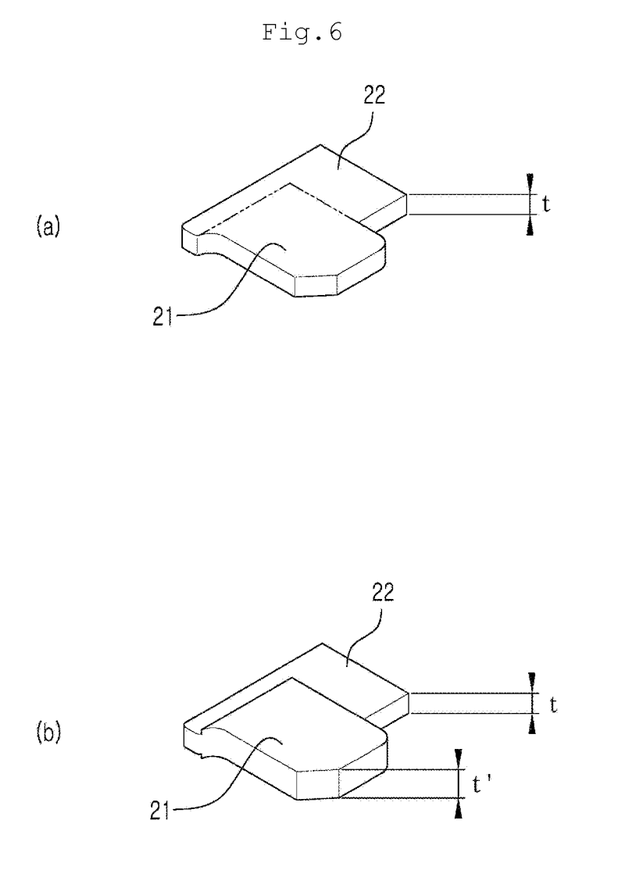
FIG. 6 is a view illustrating different examples of an adjusting liner included in the holder for a spot welder tip dresser with an adjustable cutting rate in accordance with the exemplary embodiment of the present invention.

The height of the cutter 30 protruding from the holder body 10, as illustrated in FIG. 6, is determined according to the thickness of the seat part 21 of the adjusting liner 20.

Figure 4:
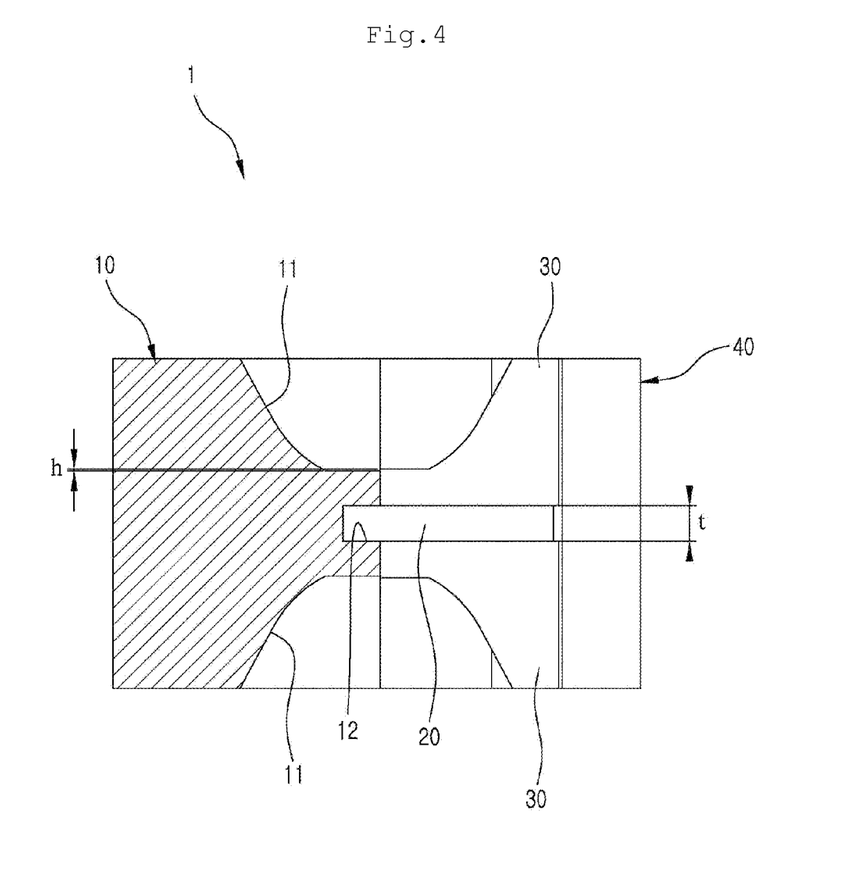
FIGS. 4 and 5 are sectional views respectively taken along the line IV-IV and the line V-V of FIG. 3.
Figure 5:
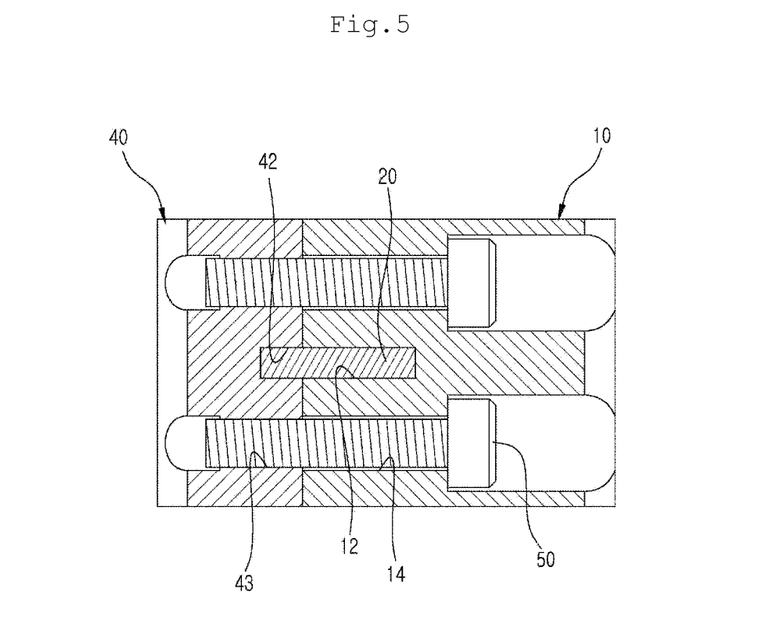

In the case where the adjusting liner corresponding to FIG. 6(a) is installed, the cutter 30, as illustrated in FIG. 4, protrudes from the holder body 10 by a predetermined height h. That is, when a welding gun applies the highest pressure, it is possible to prevent excessive cutting of the tip beyond the predetermined height h by use of the adjusting liner in which the seat part 21 and the insert part 22 have the same thickness t.

Figure 7:
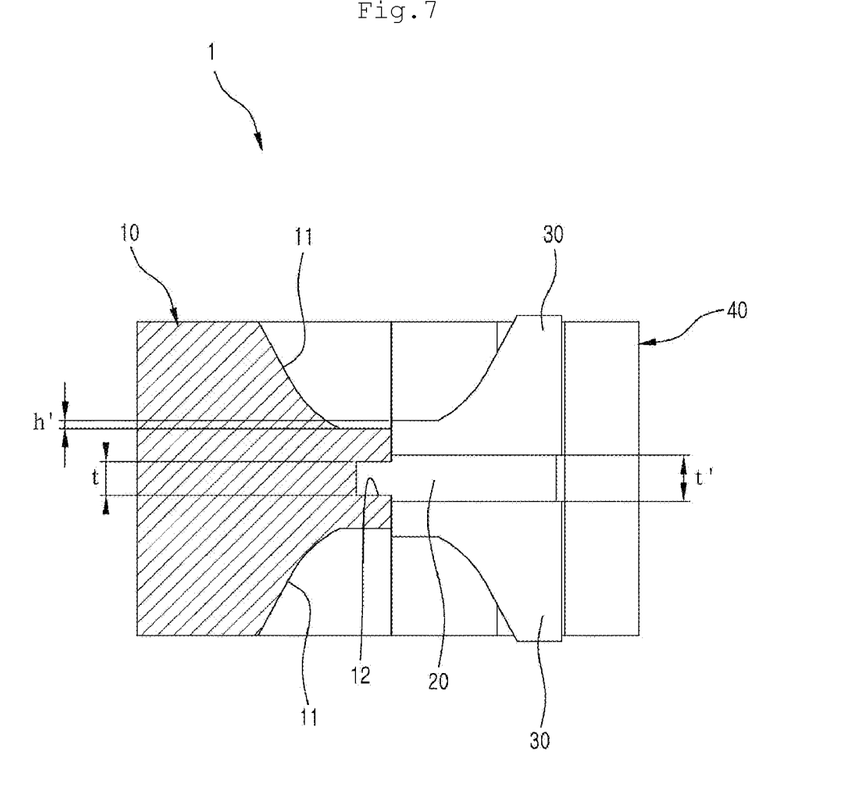
FIG. 7 is a sectional view illustrating another example of the adjusting liner included in the holder for a spot welder tip dresser with an adjustable cutting rate in accordance with the exemplary embodiment of the present invention.

In the case where the adjusting liner corresponding to FIG. 6(b) is installed, the cutter 30, as illustrated in FIG. 7, protrudes from the holder body 10 by a predetermined height h'. That is, when the welding gun applies the lowest pressure, it is possible to prevent deterioration in the cutting rate of the tip below a preset value or to assure appropriate cutting of the tip by use of the adjusting liner in which a thickness t' of the seat part 21 is greater than a thickness t of the insert part 22. If necessary, the adjusting liner corresponding to FIG. 6(b) may be used in order to increase the cutting rate of the tip even if the welding gun applies high pressure.

Although the holder 1 may be configured in such a manner that the height of the insertion groove 12 of the holder body 10 is increased, the thickness of the entire adjusting liner 20 is determined to suit the insertion groove 12 and the seat part 21 is concavely formed, it is desirable to cut the insert part 22 using an end-mill or the like, in order to easily fabricate the adjusting liner 20 with a plate having a thickness corresponding to the protruding height of the cutter 30. Accordingly, the adjusting liner 20 may be more easily fabricated, which results in reduction in the overall fabrication time of the holder 1 for a spot welder tip dresser with an adjustable cutting rate.

Although the above description deals with two examples with respect to the thickness of the seat part 21 of the adjusting liner 20, the thickness of the seat part 21 may be selected from among various values according to the kind of welding gun used.

Figure 8:
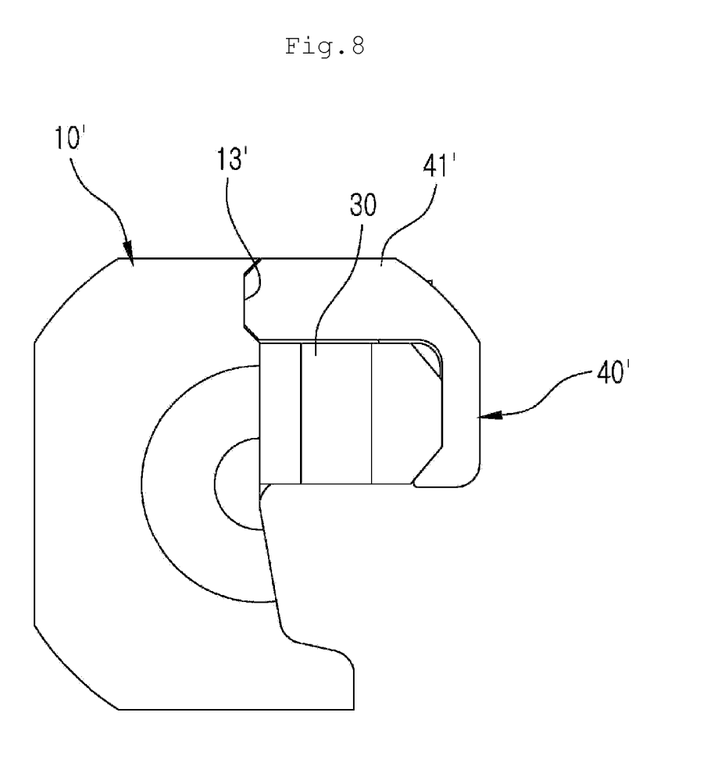
FIG. 8 is a plan view of a holder for a spot welder tip dresser with an adjustable cutting rate in accordance with another exemplary embodiment of the present invention.

Referring to FIG. 8 illustrating another exemplary embodiment of the present invention, to achieve easy manufacture of a holder body 10', a coupling surface 13' of the holder body 10' may be flush with the remainder of the holder body 10' and a coupling portion 41' of a clamp 40' may be extended to enable coupling between the clamp 40' and the holder 10'. As such, the holder body 10' may be more easily manufactured and overall manufacturing time may be reduced.

In the present embodiment, the same or similar elements designated by the same reference numerals as those used in the previously described embodiment are not repeatedly described for clarity of description.

As is apparent from the above description, the present invention provides a holder for a spot welder tip dresser with an adjustable cutting rate, wherein an adjusting liner, which is capable of adjusting the protruding length of a cutter, irrespective of the use of an air gun or a servo gun, is installed, which has the effect of maintaining a constant cutting rate of a spot welder tip. Further, as a result of providing a guide surface of a holder body with the angle of circumference in a range between 185 degrees and 200 degrees, it is possible to prevent a spot welder tip from deviating from the guide surface and to provide the tip with even nuggets. In this way, excessive cutting of the tip is excluded, which can reduce maintenance costs, and enhanced welding quality and reduced overall welding time can be accomplished owing to rapid cutting of the tip and formation of even nuggets.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A holder comprising:
    a holder body having a first guide surface and a second guide surface on both ends of the holder body;
    a clamp coupled to the holder body;
    a first cutter coupled to the clamp, positioned corresponding to the first guide surface;
    a second cutter coupled to the clamp, positioned corresponding to the second guide surface; and
    one of a first adjusting liner and a second adjusting liner,
        the first adjusting liner having a first thickness, and
        the second adjusting liner having a second thickness,
        wherein the first thickness and the second thickness are distinct from one another,
        wherein the first and second adjusting liners are configured to be interchangeably and detachably disposed between the first and second cutters and to adjust a predetermined height of the first and second cutters with respect to the first and second guide surfaces due to a difference between the first thickness and the second thickness.

2. The holder according to claim 1, wherein the holder body includes an insertion groove formed between the first and second guide surfaces, and the insertion groove is configured to accommodate the one of the first adjusting liner and the second adjusting liner.

3. The holder according to claim 1, wherein the clamp has a guide groove configured to accommodate the one of the first adjusting liner and the second adjusting liner.

4. The holder according to claim 1, wherein each of the first and second guide surfaces has a circle sector shaped cross section with a central angle in a range of from 185 degrees to 200 degrees so as to discharge chips cut.

5. The holder according to claim 1, wherein the clamp has a protrusions to prevent the one of the first adjusting liner and the second adjusting liner from deviating from the holder body.

6. The holder according to claim 1, wherein each of the first and second guide surfaces has a circle sector shaped cross section with a central angle at 190 degrees so as to discharge chips cut.

7. The holder according to claim 1, wherein the clamp is detachably attached to the holder body.

8. The holder according to claim 1, wherein the first adjusting liner has a first seat part having the first thickness, and the second adjusting liner has a second seat part having the second thickness, and wherein the first thickness is greater than the second thickness.

* * * * *